United States Patent [19]

Magee

[11] Patent Number: 4,833,380

[45] Date of Patent: May 23, 1989

[54] HOIST MOTOR PROTECTION

[76] Inventor: John E. Magee, 85 Milford Point Rd., Milford, Conn. 06460

[21] Appl. No.: 214,212

[22] Filed: Jul. 1, 1988

[51] Int. Cl.⁴ .......................... H02P 3/04; B66B 1/06

[52] U.S. Cl. .................................. 318/484; 187/108; 187/112

[58] Field of Search ............... 187/100, 105, 108, 110, 187/112, 122; 318/306, 445, 447, 452, 484, 485, 487

[56] References Cited

U.S. PATENT DOCUMENTS 3,369,633 2/1968 Martin ................................ 187/110

4,680,512 7/1987 Melocik .......................... 318/484 X

FOREIGN PATENT DOCUMENTS 1134518 1/1985 U.S.S.R. ............................. 187/112

*Primary Examiner*—William M. Shoop, Jr.

*Assistant Examiner*—W. E. Duncanson, Jr.

*Attorney, Agent, or Firm*—Brooks, Haidt, Haffner & Delahunty

[57] ABSTRACT

In an elevator system in which the elevator cars are moved by a hoist motor with a brake and the hoist motor is energized by controls to cause energization of the motor, movement of a car and release of the brake, motor protecting circuits which are time rather than current magnitude responsive. One protective circuit includes a time delay relay which is activated upon energization of the motor and which causes deenergization of the motor if the motor is energized longer than the time it normally takes a car to travel from the lower floor to the upper floor or vice versa. The other protective circuit includes a time delay relay which is activated when the motor is energized and the brake fails to release and which cause deenergization of the motor if the brake fails to release within a predetermined time. Either circuit may be used alone. Also, an indicator to indicate operation of a time delay to deenergize the motor.

12 Claims, 1 Drawing Sheet

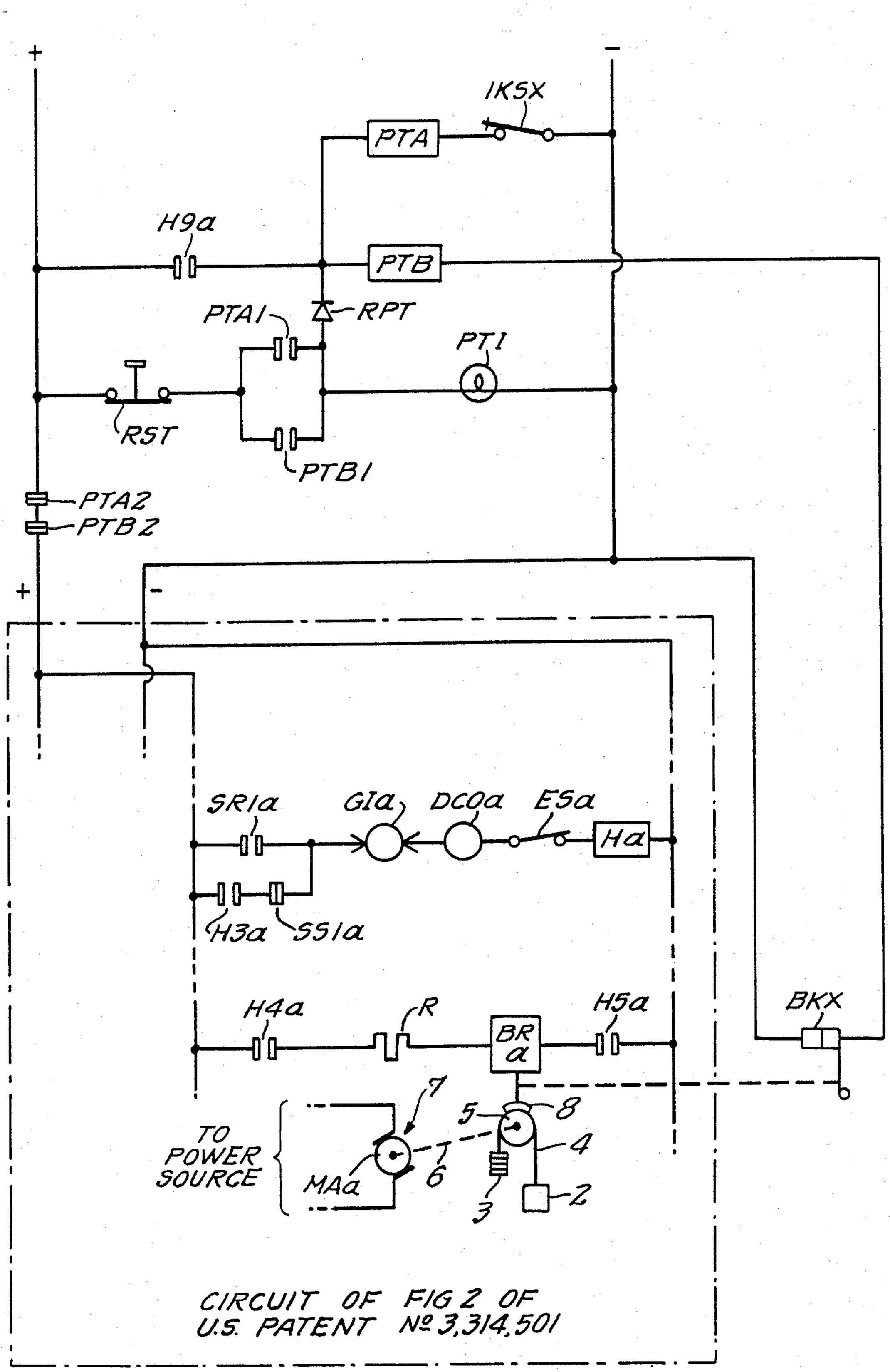
+
−
IKSX
PTA
H9a
PTB
PTA1
RPT
PT1
RST
PTB1
PTA2
PTB2
+
−
SR1a
G1a
DCOa
ESa
Ha
H3a
SS1a
H4a
R
BR a
H5a
BKX
7
5
8
4
TO POWER SOURCE
MAa
6
3
2
CIRCUIT OF FIG 2 OF
U.S. PATENT № 3,314,501

HOIST MOTOR PROTECTION

This invention relates to protective circuits for electrically energized motors and particularly, to a protective circuit for electrically energized hoist motors employed in elevator systems to raise and lower elevator cars.

It is known in the art that when an electric motor is subjected to a current greater than the normal operating current for a significant period of time, the motor can be damaged, i.e. "burned-out". Various protective devices, such as fuses, thermal switches, overload relays, etc., have been used to prevent such damage. In prior art elevator systems, the elevator car hoist motors and the motor generators which supply power thereto have been protected by delayed action current overload relays, such as a type N-301 relay sold by the Otis Elevator Co. Such relays are adjusted to open the energizing circuit a predetermined time after a current above the normal rated current of the motor being protected exists.

Delayed operation was required to accommodate normal acceleration and deceleration of the elevator which, with a load thereon, could require currents double to triple rated full load value of the motor. The delay with the overload was approximately twenty five seconds.

If the elevator car stalls in approaching a stop, usually in levelling, the stalling could fail to be accompanied by a current in excess of the overload setting. Failure of a brake to lift, such as by burnout of its coil, could persist for the full overload relay time setting. Additionally, maintenance of these overload relays frequently was neglected, since special oil was required, and because some difficulty was involved, under field conditions, in obtaining the exact current specified for tripping the relay. It is obvious that if the relay is inoperative through neglect or if the overload current is not attained, the hoist motor is not protected from damage.

It is one object of the invention to monitor and detect any potentially damaging faulty operation of the hoist equipment and to isolate the hoist motor from its power source when any such faulty operation is detected.

It is a further object of the invention that when power feed is interrupted, the opening of the power circuit is maintained until manual reconnection is determined to be advisable.

In the preferred embodiment, if the time period for which the motor power feed circuits are connected to the motor exceeds the normal time for a terminal-to-terminal trip of an elevator car, a stall condition is presumed to exist and power to the controls for the elevator car involved is interrupted by a time delay relay energized by the controls which energize the hoist motor. Also, if the power feed circuits are connected to the motor for a short period, e.g. two or three seconds, and the brake of the hoisting machine has not lifted, the power to such controls is similarly interrupted. Brake failure is detected by normally closed, mechanically operable contact opened by the brake when the brake shoe physically lifts. Accordingly, the relays can detect conditions threatening damage to the hoist motor even if such conditions do not involve overload currents. Such lesser current conditions, if permitted to exist for a substantial period of time, say overnight, can seriously damage a motor armature, even if only locally. The power to the controls remains interrupted until the relays are manually reset, and preferably, the circuits include an indicator, such as a lamp to indicate interruption of the power by the circuits of the invention.

Other objects and advantages of the invention will be apparent from the following detailed description of a preferred embodiment thereof which should be considered in conjunction with the accompanying drawing, the single FIGURE of which is a schematic wiring diagram illustrating a modification of the circuits of the automatic elevator system disclosed in U.S. Pat. No. 3,314,501 to include the invention.

Although the invention will be described in connection with the elevator car control system shown and described in U.S. Pat. No. 3,314,501, it will be apparent to those skilled in the art that the invention may be used with other elevator car control systems. Generally speaking, the protective circuits of the invention are connected to a control of the control systems so as to be energized when the hoist motor is energized and part of the protective circuits are connected to a control responsive to the position of the hoisting machine brake.

Although the invention will be described in connection with the hoisting apparatus for a single elevator car, it will be apparent that the circuits of the invention can be used with the hoisting apparatus of each elevator car in a multi-car installation.

In the drawing, the components of the circuits of the control system of U.S. Pat. No. 3,341,501 which are used to illustrate the operation of the invention are contained within the rectangle identified as "Circuit of FIG. 2 of U.S. Pat. No. 3,314,501", and the remaining components have been omitted. The added components for the operation obtained with the invention are located outside such rectangle.

As described in said U.S. Pat. No. 3,314,501, car a, having a cab 2 is connected to a counterweight 3 and is raised or lowered by a rope 4 passing over a traction sheave 5 fixed to the shaft 6 of the hoisting machine. The hoisting machine comprises a direct current motor 7 having an armature MAa supplied with current at a variable voltage from a power source in the form of a generator driven by a motor. Brake means in the form of a brake shoe 8 is controlled by a release coil BRa.

When the motor 7 is to be energized, a coil of a relay Ha forming part of the motor control means is energized and causes energization of the motor 7 and movement of the car between floors as described in said patent. The energization of the coil Ha, which causes closing of the contacts H4*a* and H5*a*, also energizes brake release coil BRa and release of the hoisting machine brake.

In accordance with the preferred embodiment of the invention, switch means in the form of a pair of contacts BKX controlled in accordance with the position of the brake shoe 8 are included. Such contacts are known in the art and open when the brake shoe 8 is clear of the associated drum. In normal operation, each time that the controls operate to cause movement of the elevator car, the contacts BKX will open in one second or less.

In accordance with the preferred embodiment of the invention, the relay Ha has an additional pair of contacts H9*a* which are closed when the coil of the relay Ha is energized. Such closure of the contacts H9*a*, with the contacts BKX closed, completes a circuit for energizing the coil of a time delay relay means PTB having normally open contacts PTB1 and normally closed contacts PTB2. Let it be assumed that there is a failure of the brake shoe 8 to lift and the relay PTB closes its contacts PTB1 and opens its contacts PTB2 two to three seconds after it is energized. With the failure of the brake shoe 8 to lift, the contacts BKX remain closed, and with the contacts H9*a* closed, contacts PTB1 will close and the contacts PTB2 will open after a delay of about 2–3 seconds. Contacts PTB1, upon closing, provide a sustaining circuit for PTB, and contacts PTB2, upon opening, will interrupt the + side of the power to the controls which deenergizes the relay Ha, and hence, interrupts the power for energization of the motor 7. Therefore, with failure of brake release, stalling the motor 7, the motor 7 will be subjected to an overload current for no more than about 2–3 seconds. As described hereinafter, the contacts of a time delay relay PTA will also be actuated about 45 seconds after the failure of the brake shoe 8 to lift without effect on the supply of power to the controls.

A manually operable, normally closed switch RST is connected in series with the contacts PTB1 and the relay PTB so that when the relay PTB operates, a holding circuit therefore is established as long as the BKX contacts are closed.

As an optional feature, indicator means in the form of an indicator lamp PTI may be included to indicate the shut down elevator, and the PTB1 contacts also establish an energizing circuit for the indicator lamp PTI. The relay PTB can be released and the lamp PTI extinguished by operating the switch RST.

The closing of the contacts H9*a*, with the manually operable switch IKSX closed, also completes a circuit for energizing the coil of a time delay relay means PTA having contacts PTA1 and PTA2. The time delay of the relay is set so as to provide a time delay corresponding substantially to the normal time for the elevator car to travel from terminal to terminal, i.e. from the lowest floor served to the highest floor served or vice versa, but not greater than three times said normal time. Let it be assumed that a stalling of the elevator car occurs and the time delay of the relay PTA is about 45 seconds. With the contacts H9*a* closed for 45 seconds by reason of a stall, the contacts PTA1 will close and the contacts PTA2 will open after 45 seconds. Closing of the PTA1 contacts establishes a holding circuit for the relay PTA and opening of the PTA2 contacts will open the power circuit for the controls and the motor 7 as described in connection with contacts PTB2. Of course, each time that the elevator car stops at a floor, causing opening of the contacts H9*a*, the timing of the relay PTA will be restarted. Closing of the contacts PTA1 will also energize the optional lamp PTI, and the relay PTA can be released and the lamp PTI can be extinguished by operating the switch RST.

Although indicator lamp PTI may be omitted, a blocking rectifier RPT should be included if the indicator lamp PTI is included in order to prevent a false illumination of the lamp PTI when the contacts H9*a* close.

Manually operable switch IKSX is included in the event that it is desired to disable the relay PTA for system inspection purposes. When the system is being inspected, long time, low speed runs may be desired, but the system is under direct supervision so that automatic interruption of the power to the motor 7 is not required. Therefore, the switch IKSX may be opened during inspection functions.

It will be observed that operation of the circuits of the invention is not dependent on the magnitude of the hoist motor current. Instead, the circuits of the invention protect the hoist motor by detecting faulty operation and by disconnecting the motor from the power source if the fault condition persists beyond a predetermined time.

While the preferred embodiment of the invention includes protection for both failure of brake release and failure of the contacts H9*a*, to open within a predetermined time, and hence, energization of the hoist motor for an abnormal time, it will be apparent that either protective circuit could be used along, e.g. by omitting the relay PTA or the relay PTB and its associated contacts and circuits.

It will be apparent to those skilled in the art that contacts in a control system which correlate with the energization of the hoist motor in a manner similar to contacts H9*a* may be used in place of the contacts H9*a*. For example, contacts such as UP and DOWN contacts which close to energize the hoist motor may replace the contacts H9*a*.

Although preferred embodiments of the present invention have been described and illustrated, it will be apparent to those skilled in the art that various modifications may be made without departing from the principles of the invention.

I claim:

1. In a motor control system, comprising an electric motor, a source of electrical power for energizing said motor and control means for causing energization of said motor by said source upon operation of said control means, the improvement comprising time delay means responsive to said control means to commence timing upon operation of said control means, said time delay means being connected to said control means and causing said control means to stop energization of said motor after a predetermined time delay which commences with operation of said control means and indicator means connected to said time delay means and operable by said time delay means at the expiration of said time delay.

2. In a motor control system comprising an electric motor, a source of electrical power for energizing said motor, control means for causing energization of said motor by said source upon operation of said control means, brake means for stopping said motor in a first condition of said brake means and for permitting operation of said motor in a second condition of said brake means and switch means responsive to the condition of said brake means, the improvement comprising time delay means responsive to said control means to commence timing upon operation of said control means, said time delay means being connected to said control means and causing said control means to stop energization of said motor after a predetermined time delay which commences with operation of said control means and being connected to said switch means for permitting operation of said time delay means when said brake means is in said first conditions thereof and for preventing operation of said time delay means when said brake

3. A motor control system as set forth in claim 2, wherein there is a source of electrical power for operating said control means and wherein said time delay means is connected intermediate the last-mentioned said source of electrical power and said control means for interrupting the power to said control means at the end of said time delay.

4. A motor control system as set forth in claim 2 further comprising further time delay means responsive to said control to commence timing upon operation of said control means, said further time delay means being connected to said control means and causing said control means to stop energization of said motor after a time delay greater than said predetermined time delay.

5. A motor control system as set forth in claim 4 further comprising further switch means connected to said further timing means for disabling said further timing means.

6. In an elevator system comprising at least one elevator car, an electric hoist motor for moving said car between a plurality of floors, a source of electrical power for energizing said motor, control means for causing energizing said motor upon operation of said control means, brake means for stopping said motor in a first condition of said brake means and for permitting operation of said motor in a second condition of said brake means and switch means responsive to the condition of said brake means, the improvement comprising time delay means responsive to said control means to commence timing upon operation of said control means, said time delay means being connected to said control means and causing said control means to stop energization of said hoist motor after a predetermined time delay which commences with operation of said control means and being connected to said switch means for permitting operation of said time delay means when said brake means is in said first condition thereof and for preventing operation of said time delay means when said brake means is in said second condition thereof.

7. An elevator system as set forth in claim 6, wherein there is a source of electrical power for operating said control means and wherein said time delay means is connected intermediate the last-mentioned said source of electrical power and said control means for interrupting the power to said control means at the end of said time delay.

8. A motor control system as set forth in claim 6, further comprising further time delay means responsive to said control to commence timing upon operation of said control means, said further time delay means being connected to said control means and causing said control means to stop energization of said motor after a time delay greater than said predetermined time delay.

9. An elevator system as set forth in claim 8 wherein said plurality of floors are spaced vertically and the uppermost and lowermost of said floors are terminal floors and wherein said electric hoist motor moves said car between a plurality of vertically spaced positions, said motor normally moving said car between said terminal floors in a predetermined time and wherein said time delay greater than said predetermined time delay is at least equal to said predetermined time.

10. A motor control system as set forth in claim 8 further comprising further switch means connected to said further timing means for disabling said further timing means.

11. In an elevator system comprising at least one elevator car, an electric hoist motor for moving said car between a plurality of vertically spaced floors, the uppermost and lowermost of said floors being terminal floors and said motor normally moving said car between said terminal floors in a predetermined time, brake means which, in a first condition thereof, prevents operation of said motor and, in a second condition thereof, permits operation of said motor, and control means for causing energization of said motor upon operation of said control means, the improvement comprising:

first time delay means responsive to said control means to commence timing upon operation of said control means, said time delay means being connected to said control means and causing said control means to stop energization of said motor after a time delay at least equal to said predetermined time but less than three times said predetermined time;

switch means responsive to the condition of said brake means; and second time delay means responsive to said control means and to said switch means for causing said control means to stop energization of said motor means a predetermined time after said control means is operated and said brake means is in said first conditions thereof for the last-mentioned predetermined time.

12. In an elevator system comprising at least one elevator car, an electric hoist motor for moving said car between a plurality of floors, a source of electrical power for energizing said motor, and control means for causing energizing said motor upon operation of said control means, the improvement comprising time delay means responsive to said control means to commence timing upon operation of said control means, said time delay means being connected to said control means and causing said control means to stop energization of said hoist motor after a predetermined time delay which commences with operation of said control means and indicator means connected to said time delay means and operable by said time delay means at the expiration of said time delay.

* * * * *

UNITED STATES PATENT AND TRADEMARK OFFICE

CERTIFICATE OF CORRECTION

PATENT NO. : 4,833,380

DATED : May 23, 1989

INVENTOR(S) : Magee

It is certified that error appears in the above-identified patent and that said Letters Patent is hereby corrected as shown below:

Col. 4, line 10, change "along" to --alone--;

Col. 4, line 58, after "brake" insert --means is in said second condition thereof.--

Signed and Sealed this

Sixth Day of February, 1990

*Attest:*

JEFFREY M. SAMUELS

*Attesting Officer*

*Acting Commissioner of Patents and Trademarks*